United States Patent
Hollifield

(10) Patent No.: US 8,918,250 B2
(45) Date of Patent: Dec. 23, 2014

(54) SYSTEM AND METHOD FOR DISPLAY OF INFORMATION USING A VEHICLE-MOUNT COMPUTER

(71) Applicant: Hand Held Products, Inc., Fort Mill, SC (US)

(72) Inventor: Linda F. Hollifield, Duluth, GA (US)

(73) Assignee: Hand Held Products, Inc., Fort Mill, SC (US)

( * ) Notice: Subject to any disclaimer, the term of this patent is extended or adjusted under 35 U.S.C. 154(b) by 26 days.

(21) Appl. No.: 13/902,110

(22) Filed: May 24, 2013

(65) Prior Publication Data

US 2014/0350782 A1    Nov. 27, 2014

(51) Int. Cl.
| | | |
|---|---|---|
| *G06F 7/00* | (2006.01) | |
| *B60R 1/00* | (2006.01) | |
| *G06F 3/0488* | (2013.01) | |
| *G06F 3/03* | (2006.01) | |

(52) U.S. Cl.
CPC ........... *B60R 1/00* (2013.01); *B60K 2350/1024* (2013.01); *G06F 3/0488* (2013.01); *G06F 3/0312* (2013.01)
USPC .............................. 701/36; 701/487; 345/173

(58) Field of Classification Search
CPC ................... B60K 2350/1024; G01C 21/3664; G06F 3/0312; G06F 3/03545; G06F 3/0488; G06F 3/0425; G06F 2203/04809
USPC .............................. 701/36, 432, 487; 345/173
See application file for complete search history.

(56) References Cited

U.S. PATENT DOCUMENTS

| | | | | |
|---|---|---|---|---|
| 5,359,515 | A | * | 10/1994 | Weller et al. ..................... 701/45 |
| 5,689,682 | A | * | 11/1997 | Peasley et al. ..................... 703/6 |
| 5,850,209 | A | * | 12/1998 | Lemke et al. ................. 345/156 |
| 5,949,345 | A | | 9/1999 | Beckert et al. |
| 6,094,609 | A | * | 7/2000 | Arjomand .................... 701/31.5 |
| 6,226,570 | B1 | | 5/2001 | Hahn |
| 6,574,531 | B2 | | 6/2003 | Tan et al. |
| 7,489,303 | B1 | * | 2/2009 | Pryor ............................ 345/173 |

(Continued)

FOREIGN PATENT DOCUMENTS

| | | |
|---|---|---|
| EP | 0913802 A2 | 5/1999 |
| JP | H0950235 A | 2/1997 |
| WO | 2011140591 A1 | 11/2011 |

OTHER PUBLICATIONS

AVTech, Website at http://www.avtech.com.hk/eng/AVI321.htm; downloaded on Jun. 3, 2014; 1 page.

(Continued)

*Primary Examiner* — Gertrude Arthur Jeanglaude
(74) *Attorney, Agent, or Firm* — Additon, Higgins & Pendleton, P.A.

(57) ABSTRACT

A system and method displays information using a vehicle-mount computer. The system includes (i) a computer touch screen for inputting and displaying information; (ii) a motion detector for detecting vehicle motion; (iii) a proximity sensor for detecting proximity to an item; and (vi) a vehicle-mount computer in communication with the computer touch screen, the motion detector, and proximity sensor, the vehicle-mount computer including a central processing unit and memory. The vehicle-mount computer's central processing unit is configured to store information associated with user-selected information from the computer touch screen and to display a zoomed view of the user-selected information on the computer touch screen. Further, the vehicle-mount computer's central processing unit is configured to override screen-blanking when user-selected information is displayed.

20 Claims, 4 Drawing Sheets

(56) References Cited

U.S. PATENT DOCUMENTS

| | | | |
|---|---|---|---|
| 8,077,143 B2 | 12/2011 | Panabaker et al. | |
| 8,514,172 B2 | 8/2013 | Panabaker et al. | |
| 2008/0211779 A1* | 9/2008 | Pryor | 345/173 |
| 2009/0085863 A1 | 4/2009 | Panabaker et al. | |
| 2010/0090816 A1* | 4/2010 | Hirsch et al. | 340/438 |
| 2012/0062455 A1 | 3/2012 | Panabaker et al. | |

OTHER PUBLICATIONS

AVTech, "AVI311 PTZ Network Camera", Jan. 2, 2013, 2 pages.

* cited by examiner

SYSTEM AND METHOD FOR DISPLAY OF INFORMATION USING A VEHICLE-MOUNT COMPUTER

FIELD OF THE INVENTION

The present invention relates generally to computer systems, and, more specifically, to systems and methods for displaying information using a vehicle-mount computer during vehicle motion.

BACKGROUND

Businesses have achieved greater productivity in recent years by deploying mobile computing devices into the field to assist workers. For example, workers use vehicle-mount computers to display important information in the field. Vehicle-mount computers are computing devices that are specially designed to mount to a vehicle and be used by the vehicle operator. For instance, several types of vehicle-mount computers are available for installation and use in commercial vehicles including forklifts, warehouse vehicles, cranes, and delivery trucks and vans.

Vehicle-mount computer systems typically utilize a screen for displaying information to a vehicle operator or other occupant. The computer system may incorporate a touch screen, or other input device, so that the user can select desired information for display. A forklift operator may, for example, view inventory information regarding shipped or inventoried products, location information regarding the next item to be loaded for shipping, and navigation information relating to the item to be loaded directly from the cabin of the forklift using a vehicle-mount computer. The various types of user-selected information may be displayed either individually on the full area of a vehicle-mount computer screen or simultaneously on the computer screen using split-screen or otherwise partitioned views.

For safety reasons, vehicle-mount computer systems may incorporate a screen blanking or lock-out feature to prevent a driver of a vehicle from viewing or otherwise interacting with the vehicle-mount computer system while the vehicle is in motion. To prevent distractions that may cause accidents, the blanking or lock-out feature may disable all aspects of the computer system preventing all interaction by the driver during vehicle motion, or otherwise during potential vehicle motion such as when the vehicle is put into gear. Disabling of the computer system or blanking the computer screen is undesirable, however, due to the fact that the driver is not able to access relevant information during vehicle motion, such as delivery information relating to an item.

Although businesses have effectively employed vehicle-mount computers to increase worker productivity and improve the inbound, internal, and outbound flow of resources, challenges exist relating to the safe and effective display of information on vehicle-mount computer screens when a vehicle, such as a forklift, is in motion or is potentially in motion. When a vehicle is in motion, the information displayed must be easily read by the vehicle operator at a glance so that the screen blanking safety feature becomes unnecessary. Moreover, when in motion the driver may prefer that only certain information be displayed on the vehicle-mount computer such as, for example, information relating to the next item that will be picked up.

Although a vehicle operator could potentially configure a vehicle-mount computer to display certain desired information prior to placing the vehicle in motion, the driver would then have to remember the relevant information during vehicle motion after the screen blanking feature or lock-out feature is engaged. This is particularly inefficient for industrial vehicles that are continually picking up and delivering items.

Therefore, a need exists for improved systems and methods for displaying information using a vehicle-mount computer so that the computer screen blanking feature is overridden and information of interest that has been selected by a driver will be automatically displayed during vehicle motion. More particularly, there exists a need for a system to (1) obtain and store user-selected information on a vehicle-mount computer screen; (2) bypass computer screen blanking; and (3) provide an easily-readable, centered and zoomed view of the selected information when the vehicle is in motion.

Further, there exists a need for improved systems and methods for displaying information using a vehicle-mount computer that are adaptive as to the information of interest selected by a driver. More particularly, there exists a need for systems and methods that can automatically display additional information associated with user-selected information that might be more relevant when the vehicle is in motion or otherwise at various locations in relation to the item of interest.

SUMMARY

Accordingly, in one aspect, the present invention embraces a system for displaying information using a vehicle-mount computer, including a computer touch screen for inputting and displaying information, a motion detector for detecting vehicle motion, and a vehicle-mount computer in communication with the computer touch screen and the motion detector, the vehicle-mount computer including a central processing unit and memory. The vehicle-mount computer's central processing unit is configured to store information associated with user-selected information from the computer touch screen, receive vehicle-motion information from the motion detector, control the display of user-selected information on the computer touch screen, and the vehicle-mount computer's central processing unit includes a blanking feature that blanks the computer touch screen in response to the motion detector's detection of motion unless the computer touch screen is displaying user-selected information.

In an exemplary embodiment, the vehicle-mount computer's central processing unit is configured to control the display of a zoomed view of the user selected information on the computer touch screen.

In another exemplary embodiment, the zoomed view covers at least about 50% of the display area of the computer touch screen.

In yet another exemplary embodiment, the vehicle-mount computer's central processing unit is configured to control the display of a zoomed view of the user selected information and additional information associated with the user-selected information on the computer touch screen in response to the motion detector's detection of motion.

In yet another exemplary embodiment, the user selected information displayed includes additional information associated with the user-selected information.

In yet another exemplary embodiment, the additional information associated with the user-selected information includes delivery navigation information.

In yet another exemplary embodiment, the additional information associated with the user-selected information includes information regarding an item for pickup.

In yet another exemplary embodiment, the item for pickup is a pallet of goods.

In yet another exemplary embodiment, the system includes a proximity sensor for detecting vehicle location, and the vehicle-mount computer's central processing unit is configured to receive vehicle-location information from the proximity sensor and in response to vehicle-location information, the central processing unit is configured to display on the computer touch screen additional information associated with the user selected information.

In yet another exemplary embodiment, the vehicle-mount computer includes a network interface.

In yet another exemplary embodiment, the vehicle-mount computer receives the additional information associated with the user selected information through the network interface.

In yet another exemplary embodiment, the user-selected information is within a user-selected area on the computer touch screen.

In yet another exemplary embodiment, the user-selected area includes a circle.

In yet another exemplary embodiment, the configuration of the user-selected area is predetermined by the vehicle-mount computer.

In yet another exemplary embodiment, the vehicle-mount computer includes a network interface.

In yet another exemplary embodiment, the motion detector includes an accelerometer, a gps locator, a gyroscope, and/or a compass.

In another aspect, the invention embraces a method for displaying data using a vehicle-mount computer, including monitoring vehicle motion with a motion detector, unless the computer touch screen is displaying user selected information, blanking the computer touch screen in response to the detection of vehicle motion, selecting user selected information on a computer touch screen of the vehicle-mount computer, and after the step of selecting user selected information, storing in the vehicle-mount computer the user selected information.

In an exemplary embodiment, the method includes displaying additional information associated with the user selected information on the computer touch screen display.

In another exemplary embodiment, the vehicle-mount computer includes a network interface.

In yet another aspect, the invention embraces a method for displaying data using a vehicle-mount computer including monitoring vehicle motion with a motion detector, unless the computer touch screen is displaying user selected information, blanking the computer touch screen in response to the detection of vehicle motion, selecting user selected information on a computer touch screen of the vehicle-mount computer, after the step of selecting user selected information, storing in the vehicle-mount computer the user selected information, monitoring vehicle proximity to a location with a proximity sensor, and after detecting vehicle proximity to a location, displaying additional information associated with the user-selected information on the computer touch screen in response to certain detected locations.

The foregoing, as well as other objectives and advantages of the invention, and the manner in which the same are accomplished, are further specified within the following detailed description and its accompanying drawings.

DETAILED DESCRIPTION

Figure 1:
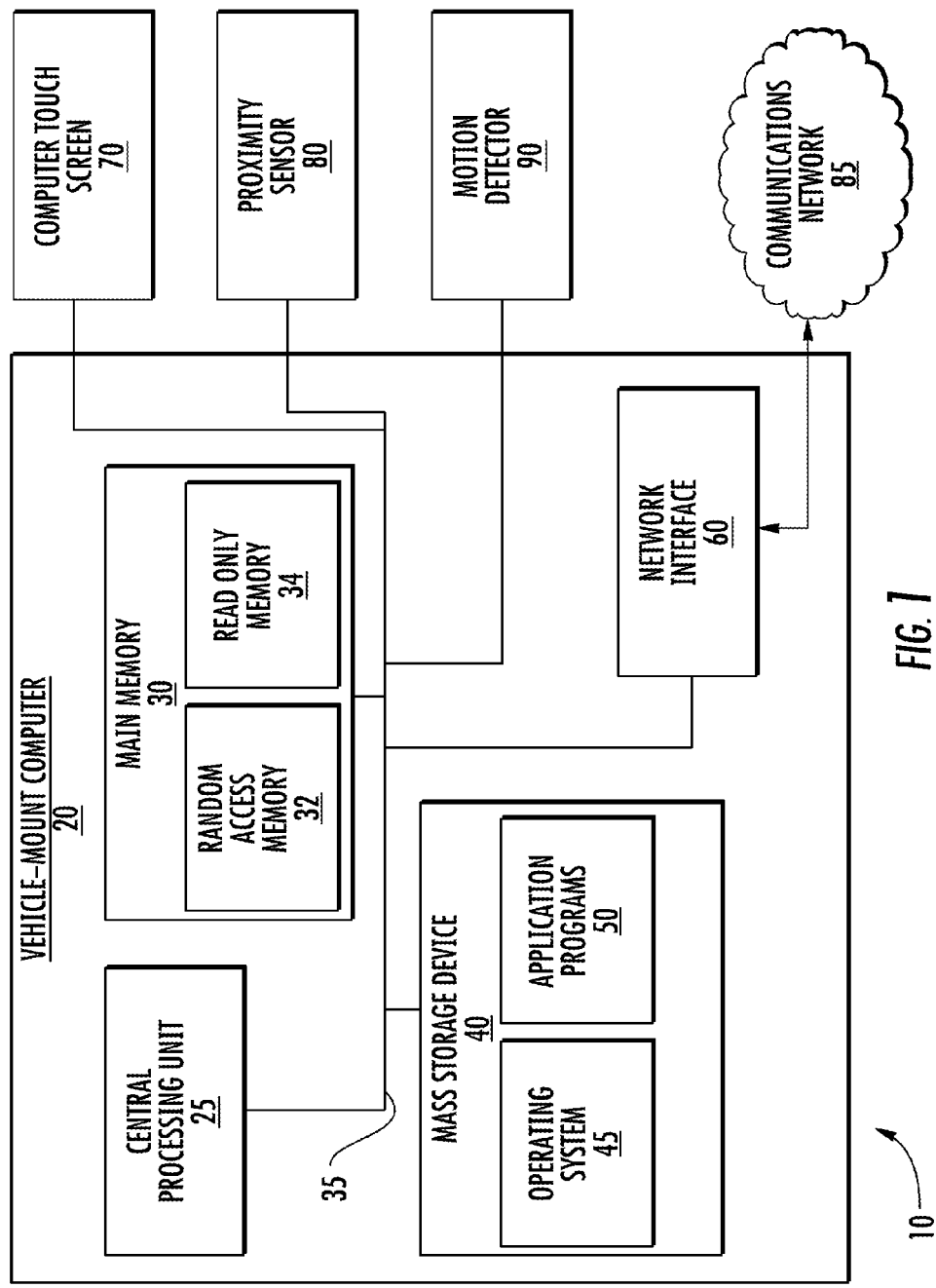
FIG. 1 is a schematic block diagram illustrating components for an exemplary system for displaying information using a vehicle-mount computer according to the present invention.

The present invention embraces systems and methods for displaying information. In particular, the present invention embraces systems and methods for displaying information using a vehicle-mount computer during vehicle motion.

In an exemplary embodiment, the system for displaying information using a vehicle-mount computer according to the present invention may include a vehicle-mount computer having a central processing unit, a system bus, a main memory, a mass storage device, an operating system stored on the mass storage device and executed by the central processing unit, and a computer touch screen for receiving input from a user and displaying information. The components of the vehicle-mount computer may be connected and in communication with each other by way of the system bus. The exemplary system may also include a motion detector connected to and in communication with the vehicle-mount computer. Moreover, the exemplary system could include a proximity sensor connected to and in communication with the vehicle-mount computer.

In another exemplary embodiment, the method for displaying information using a vehicle-mount computer according to the present invention includes providing a vehicle-mount computer having a central processing unit, a system bus, a main memory, a mass storage device, an operating system stored on the mass storage device and executed by the central processing unit, and a computer touch screen for receiving input from a user and displaying information. The exemplary method according to the present invention may further include the steps of connecting a motion detector to the vehicle-mount computer for detecting vehicle motion. The exemplary method according to the present invention may further include the steps of displaying a zoomed view of user-selected information on the computer touch screen. Further, the exemplary method according to the present invention may include the step of overriding lock-out or screen blanking during vehicle motion.

In yet another exemplary embodiment, the method for displaying information using a vehicle-mount computer according to the present invention may include providing a vehicle-mount computer having a central processing unit, a system bus, a main memory, a mass storage device, an operating system stored on the mass storage device and executed by the central processing unit, and a computer touch screen for receiving input from a user and displaying information. The exemplary method according to the present invention may further include the steps of connecting a motion detector to the vehicle-mount computer for detecting vehicle motion and a proximity sensor for detecting vehicle location in relation to items of interest. The exemplary method may further include the steps of displaying a zoomed view of user-selected information on the computer touch screen and overriding screen-blanking upon the detection of vehicle motion. The exemplary method may also include the steps of, upon the motion detector's detection of vehicle motion or the proximity sensor's detection of certain specified locations, displaying additional information relating to the user-selected items of interest.

Non-limiting examples of typical vehicles that may employ the system and method for displaying information using a vehicle-mount computer according to the present invention include forklifts, cranes, delivery trucks and similar industrial vehicles (e.g., vehicles used in industrial operations, factory or warehouse settings, and the like). References in the disclosure to particular types of vehicles are not intended to limit the disclosure to particular vehicles.

Referring now to the drawings, FIG. 1 is a schematic block diagram illustrating components of an exemplary system 10 for displaying information using a vehicle-mount computer. Vehicle-mount computer 20 includes a mass storage device 40 for storing an operating system 45 and various application programs 50. The mass storage device 40 may store other types of information as well.

As illustrated in FIG. 1, operating system 45 of the exemplary embodiment consists of software that controls the overall operation of the vehicle-mount computer 20, including process scheduling and management, process protection, and memory management. Examples of suitable operating systems include, but are not limited to, WINDOWS® 7 and WINDOWS® EMBEDDED COMPACT (i.e., WINDOWS® CE) from MICROSOFT® CORPORATION of Redmond, Wash., and the LINUX® open source operating system. Typically, operating system 45 is loaded by booting the vehicle-mount computer 20 and is executed directly by the central processing unit 25.

Application programs 50 (FIG. 1) include any number of executable software programs designed to assist the vehicle operator in the performance of specific tasks. Application programs 50 may load automatically upon execution of operating system 45 or in response to an input from the vehicle operator.

Main memory 30 (FIG. 1) provides for storage of instructions and information directly accessible by central processing unit 25. Main memory 30 may be configured to include random-access memory 32 (RAM) and read-only memory 34 (ROM). The ROM 34 may permanently store firmware or a basic input/output system (BIOS), which provides first instructions to vehicle-mount computer 20 when it is booted. RAM 32 may serve as temporary and immediately accessible storage for operating system 45 and application programs 50.

Mass storage device 40 (FIG. 1) may be any of the various types of computer components capable of storing large amounts of data in a persisting (i.e., non-volatile) and machine-readable manner. Typically, mass storage device 40 may be a hard disk drive. Alternatively, mass storage device 40 may be a solid state drive, optical drive, removable flash drive or any other component with similar storage capabilities.

As illustrated in FIG. 1, computer touch screen 70 may be provided for inputting and displaying information using vehicle-mount computer 20. Computer touch screen 70 is operably connected to, and in communication with, vehicle-mount computer 20. Touch screen 70 may display information to users in the form of text or graphical output generated by vehicle-mount computer 20. Persons having skill in the art will appreciate that computer touch screen 70 may incorporate any appropriate touch screen technology having the ability to sense touch (e.g., resistive, capacitive, etc.) and that is conducive to the operating environment of the vehicle. Although touch screen 70 is illustrated in FIG. 1, other input devices (e.g., keyboard or mouse) or display devices may be utilized in connection with vehicle-mount computer 20.

As depicted in FIG. 1, an exemplary embodiment of the vehicle-mount computer 20 of the system 10 for displaying information using a vehicle-mount computer may also include network interface 60. Network interface 60 is operably connected to communications network 85, enabling vehicle-mount computer 20 to communicate with communications network 85. Communications network 85 may include any collection of computers or communication devices interconnected by communication channels. The communication channels may be wired or wireless. Examples of such communication networks include, without limitation, local area networks, the Internet, and cellular networks. The connection to communications network 85 allows vehicle-mount computer 20 to communicate with other network nodes. For example, a central dispatcher could send instructions (e.g., a delivery schedule for pickup and drop off) from a scheduling server to the vehicle operator via communications network 85.

Motion detector 90 (FIG. 1) may include any number of sensors or other appropriate devices that detect vehicle movement or potential vehicle movement. Motion detector 90 is operably connected to and in communication with vehicle-mount computer 20. Those having skill in the art will appreciate that any of a number of sensors may be utilized to detect vehicle movement including, but not limited to, an accelerometer, gps locator, gyroscope, compass, or some appropriate combination of a number of sensors or devices. Sensors could also monitor potential vehicle movement, such as when the vehicle is placed into gear or otherwise made ready for movement by the user. As the term is used herein, vehicle motion specifically embraces the concept of actual motion as well as potential motion.

As depicted in FIG. 1, an exemplary embodiment of the vehicle-mount computer 20 of the system 10 for displaying information using a vehicle-mount computer may also include proximity sensor 80. Proximity sensor 80 may be operably connected to and in communication with vehicle-mount computer 20. Those having skill in the art will appreciate that any of a number of sensors may be utilized to detect vehicle proximity to a selected item or location including, but not limited to, a gps locator and/or some appropriate combination of other sensors or devices. Thus, in some embodiments, the motion detector 90 could operate as a proximity sensor 80, or the elements may be combined as to their use of certain sensors to perform their functions.

Central processing unit 25 is configured to store information associated with user-selected information within a user-selected area from the computer touch screen 70. As illustrated in the exemplary embodiment (FIG. 1), the central processing unit 25 may execute application programs 50 to at least temporarily store information relating to user-selected information within a user-selected area, such as a circle, input from computer touch screen 70.

Figure 2:
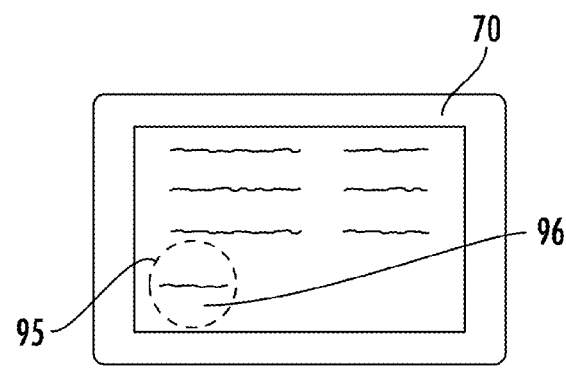
FIG. 2 illustrates exemplary user-selected information within a user-selected area from a computer touch screen according to the present invention.

As illustrated in FIG. 2, the vehicle-mount computer's 20 central processing unit 25, along with other components of system 10, such as application programs 50, may be configured to store user-selected information 96 associated with a user-selected area 95 from computer touch screen 70.

Although the user-selected area 95, as depicted in FIG. 2, consists of a circle, the user-selected area 95 could consist of any configuration.

Figure 3:
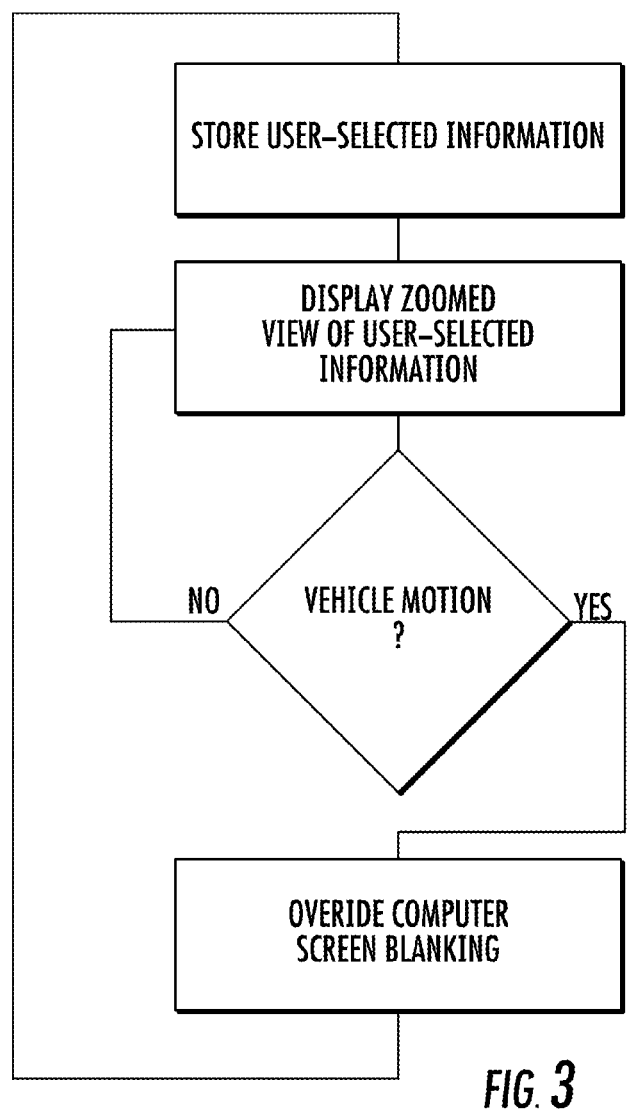
FIG. 3 illustrates the communication of certain elements of the exemplary embodiment for using a vehicle-mount computer according to the present invention.

FIG. 3 illustrates how certain of the above described elements of the exemplary system 10 for displaying information using a vehicle-mount computer may communicate in order to display user-selected information. As set forth above, the vehicle-mount computer's 20 central processing unit 25 is configured to receive vehicle-motion information from motion detector 90. The vehicle-mount computer's 20 central processing unit 25 is configured to disable or override computer lock-out or screen-blanking when user-selected information 96 has been selected and stored. Computer lock-out, or screen blanking, is a security feature that may otherwise be triggered by vehicle motion or potential vehicle motion. The vehicle-mount computer's 20 central processing unit 25 is further configured to control the storage and display of a zoomed view 100 (FIG. 4) of the user-selected information 96 on the computer touch screen 70 in response to the motion detector's 70 detection of vehicle motion.

Figure 4:
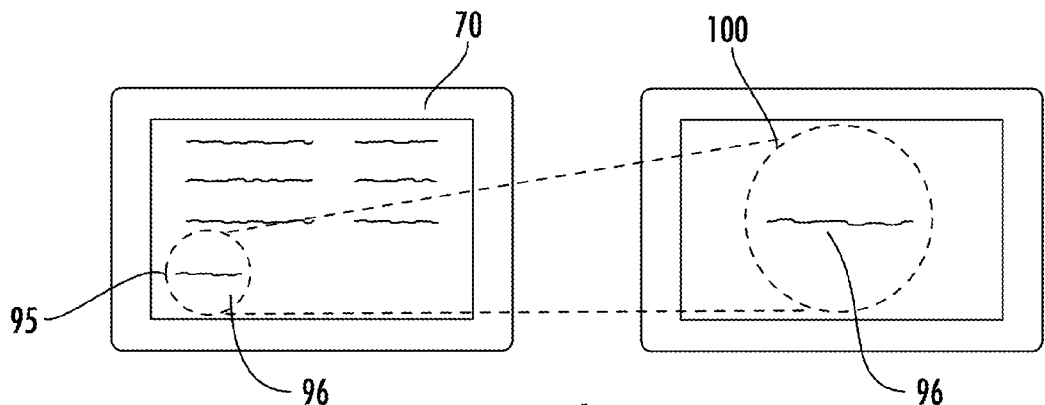
FIG. 4 depicts exemplary user-selected information according to the present invention being displayed in a zoomed view on the vehicle-mount computer during vehicle motion.

As illustrated in FIG. 4, the user-selected information 96 within user-selected area 95 may include information on the computer touch screen 70 that the vehicle operator prefers be displayed in a zoomed view 100 on the vehicle-mount computer 20 during vehicle motion. Such information may include, but is not limited to, a particular pallet or other item that is scheduled for pickup or delivery. As set forth in FIG. 4 and described above, computer screen blanking will be bypassed and the user-selected information 96 within user-selected area 95 will be displayed on the computer touch screen 70 during vehicle motion or potential vehicle motion. More particularly, the user-selected information 96 will be displayed in a zoomed view 100 (i.e., a magnified view) on the vehicle-mount computer 20 such that the user-selected area 95 is provided in a more easily-readable format when the vehicle is in motion.

Figure 5:
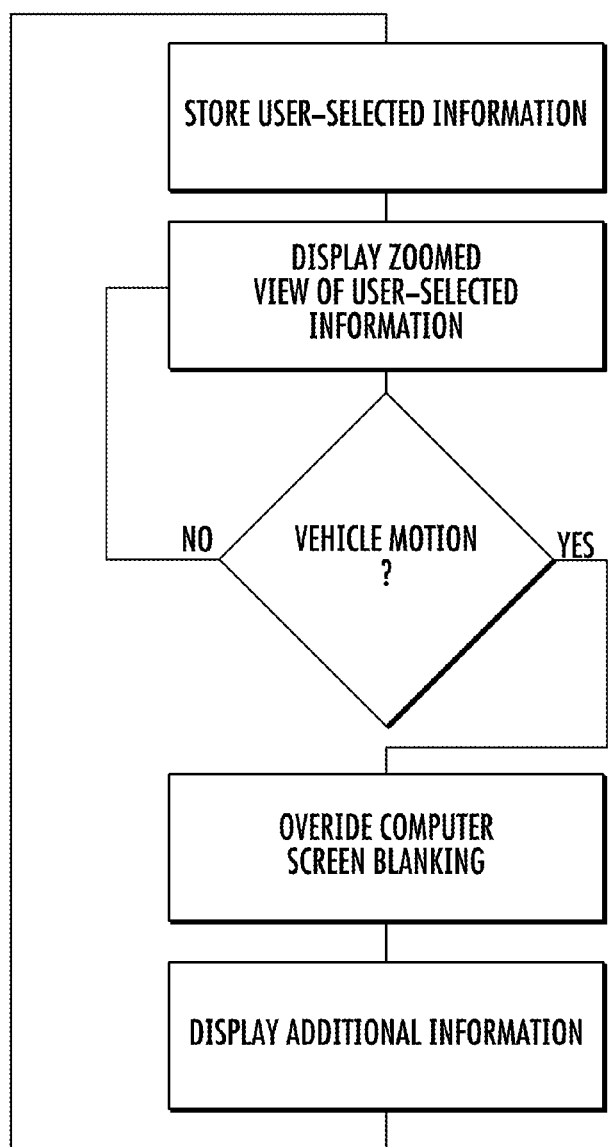
FIG. 5 illustrates the communication of certain elements of the exemplary embodiment for using a vehicle-mount computer according to the present invention.

FIG. 5 illustrates how certain of the above described elements of another exemplary system 10 for displaying information using a vehicle-mount computer may communicate in order to display user-selected information. The vehicle-mount computer's 20 central processing unit 25 is configured to control the storage and display of a zoomed view 100 of user-selected information 96 within user-selected area 95 on the computer touch screen 70. The vehicle-mount computer's 20 central processing unit 25 is configured to receive vehicle-motion information from motion detector 90. The vehicle-mount computer's 20 central processing unit 25 is also configured to disable or override computer lock-out or screen-blanking when user-selected information 96 has been selected, stored, and displayed. Additionally, as depicted in FIG. 6, vehicle-mount computer's 20 central processing unit 25 may be configured when the vehicle is moving to display additional associated information 105 that is relevant to, or more relevant than, the user-selected information 96 when the vehicle is in motion.

Figure 6:
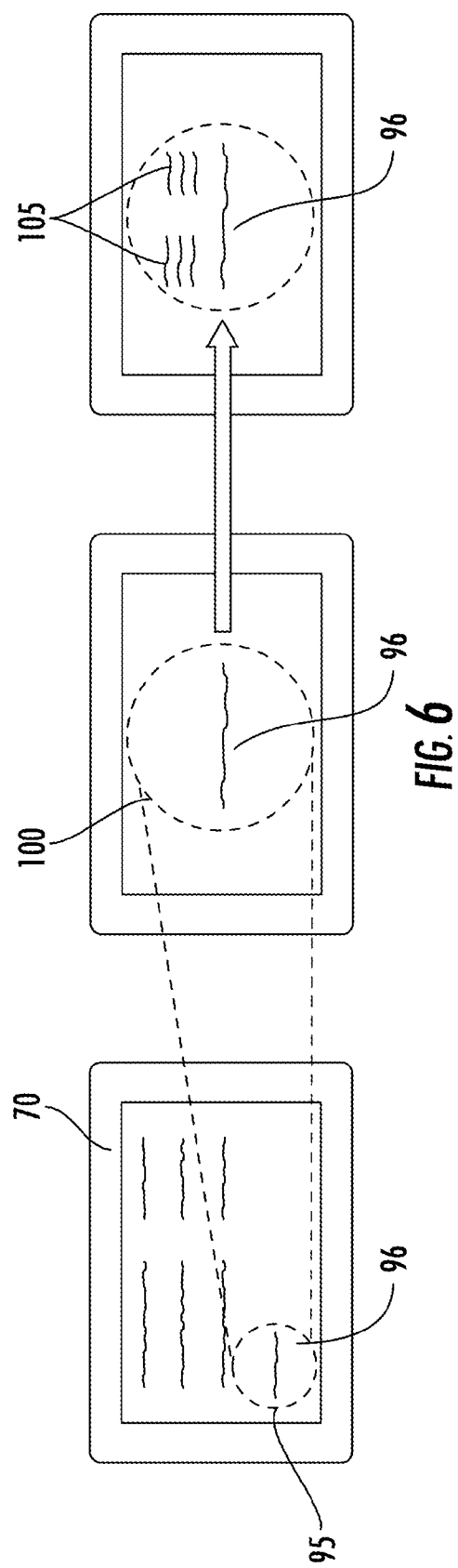
FIG. 6 depicts additional information related to exemplary user-selected information according to the present invention being displayed on the vehicle-mount computer during vehicle motion or potential vehicle motion.

As a non-limiting example, and as illustrated in FIG. 6, the user-selected information 96 that is displayed in a zoomed view 100 may be information relating to a specific pallet or item that is to be picked up by a vehicle driver. When the vehicle moves, the information on the computer screen 70 could be changed or supplemented to display more relevant additional information 105, including but not limited to information such as the location of the pallet to be picked up. Through communication of the sensors in communication with the vehicle-mount computer 20 (i.e., the sensors of proximity sensor 80 and/or motion detector 90), when the vehicle arrives within a certain distance from the item, the computer screen 70 could display other relevant information, such as a waypoint along the travel path. The computer screen 70 could also, for example, switch back to the originally zoomed view 100 when the vehicle operator arrived within a certain distance from the item.

In a non-limiting embodiment, the communications network 85, in communication with the network interface 60, central processing unit 25, and/or other appropriate elements of the system 10, may facilitate the transmission of instructions such as a pick up or delivery schedule as well as relevant additional information 105 relating to the item listed on the schedule and that may be displayed on the computer touch screen 70.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); and U.S. patent application Ser. No. 13/897,634 for a Laser Scanning Code Symbol Reading System Employing Programmable Decode Time-Window Filtering, filed May 20, 2013 (Wilz, Sr. et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system for displaying information using a vehicle-mount computer, comprising:
 a computer touch screen for inputting and displaying information;
 a motion detector for detecting vehicle motion; and
 a vehicle-mount computer in communication with the computer touch screen and the motion detector, the vehicle-mount computer including a central processing unit and memory;
 wherein the vehicle-mount computer's central processing unit is configured to store information associated with user-selected information from the computer touch screen;
 wherein the vehicle-mount computer's central processing unit is configured to receive vehicle-motion information from the motion detector;
 wherein the vehicle-mount computer's central processing unit is configured to control the display of user-selected information on the computer touch screen; and
 wherein the vehicle-mount computer's central processing unit comprises a blanking feature that blanks the computer touch screen in response to the motion detector's detection of motion unless the computer touch screen is displaying user-selected information.

2. The system of claim 1, wherein the vehicle-mount computer's central processing unit is configured to control the display of a zoomed view of the user-selected information on the computer touch screen.

3. The system of claim 2, wherein the zoomed view covers at least about 50% of the display area of the computer touch screen.

4. The system of claim 2, wherein the vehicle-mount computer's central processing unit is configured to control the display of a zoomed view of the user-selected information and additional information associated with the user-selected information on the computer touch screen in response to the motion detector's detection of motion.

5. The system of claim 1, wherein the user-selected information displayed comprises additional information associated with the user-selected information.

6. The system of claim 5, wherein the additional information associated with the user-selected information comprises delivery navigation information.

7. The system of claim 5, wherein the additional information associated with the user-selected information comprises information regarding an item for pickup.

8. The system of claim 7, wherein the item for pickup is a pallet of goods.

9. The system of claim 1, comprising a proximity sensor for detecting vehicle location;
 wherein the vehicle-mount computer's central processing unit is configured to receive vehicle-location information from the proximity sensor; and
 wherein, in response to vehicle-location information, the central processing unit is configured to display on the computer touch screen additional information associated with the user-selected information.

10. The system of claim 9, wherein the vehicle-mount computer comprises a network interface.

11. The system of claim 10, wherein the vehicle-mount computer receives the additional information associated with the user-selected information through the network interface.

12. The system of claim 1, wherein the user-selected information is within a user-selected area on the computer touch screen.

13. The system of claim 12, wherein the user-selected area comprises a circle.

14. The system of claim 12, wherein the configuration of the user-selected area is predetermined by the vehicle-mount computer.

15. The system of claim 1, wherein the vehicle-mount computer comprises a network interface.

16. The system of claim 1, wherein the motion detector comprises an accelerometer, a gps locator, a gyroscope, and/or a compass.

17. A method for displaying data using a vehicle-mount computer, comprising:
   monitoring vehicle motion with a motion detector;
   unless the computer touch screen is displaying user-selected information, blanking the computer touch screen in response to the detection of vehicle motion;
   selecting user-selected information on a computer touch screen of the vehicle-mount computer; and
   after the step of selecting user-selected information, storing in the vehicle-mount computer the user-selected information.

18. The method of claim 17, comprising displaying additional information associated with the user-selected information on the computer touch screen display.

19. The method of claim 17, wherein the vehicle-mount computer comprises a network interface.

20. A method for displaying data using a vehicle-mount computer comprising:
   monitoring vehicle motion with a motion detector;
   unless the computer touch screen is displaying user-selected information, blanking the computer touch screen in response to the detection of vehicle motion;
   selecting user-selected information on a computer touch screen of the vehicle-mount computer;
   after the step of selecting user-selected information, storing in the vehicle-mount computer the user-selected information;
   monitoring vehicle proximity to a location with a proximity sensor; and
   after detecting vehicle proximity to a location, displaying additional information associated with the user-selected information on the computer touch screen in response to certain detected locations.

* * * * *